United States Patent
Verna

(10) Patent No.: US 8,244,105 B2
(45) Date of Patent: Aug. 14, 2012

(54) TALKING REPLAY

(75) Inventor: Anthony F. Verna, Woodland Hills, CA (US)

(73) Assignee: Verna IP Holdings, LLC, Albuquerque, NM (US)

( * ) Notice: Subject to any disclaimer, the term of this patent is extended or adjusted under 35 U.S.C. 154(b) by 810 days.

(21) Appl. No.: 12/407,916

(22) Filed: Mar. 20, 2009

(65) Prior Publication Data

US 2009/0238541 A1  Sep. 24, 2009

Related U.S. Application Data

(60) Provisional application No. 61/038,127, filed on Mar. 20, 2008.

(51) Int. Cl.
*G11B 27/00* (2006.01)
*H04N 5/93* (2006.01)

(52) U.S. Cl. .................. 386/285; 386/278; 725/145

(58) Field of Classification Search ............... 386/278, 386/285; 725/143, 144, 145, 146
See application file for complete search history.

(56) References Cited

U.S. PATENT DOCUMENTS

| | | | | |
|---|---|---|---|---|
| 6,144,375 A * | 11/2000 | Jain et al. | ...... | 715/251 |
| 6,414,725 B1 * | 7/2002 | Clarin et al. | ...... | 348/714 |
| 6,504,990 B1 * | 1/2003 | Abecassis | ...... | 386/283 |
| 7,430,360 B2 * | 9/2008 | Abecassis | ...... | 386/343 |
| 7,509,021 B2 * | 3/2009 | Mughal et al. | ...... | 386/351 |
| 7,882,258 B1 * | 2/2011 | Sumler et al. | ...... | 709/231 |
| 8,009,966 B2 * | 8/2011 | Bloom et al. | ...... | 386/285 |
| 2002/0114613 A1 * | 8/2002 | Thai | ...... | 386/52 |
| 2006/0291817 A1 * | 12/2006 | Mughal et al. | ...... | 386/112 |
| 2007/0143820 A1 * | 6/2007 | Pawlowski | ...... | 725/145 |
| 2008/0008458 A1 * | 1/2008 | Gudipaty et al. | ...... | 386/131 |
| 2008/0043089 A1 * | 2/2008 | Auerbach et al. | ...... | 348/14.1 |
| 2008/0060001 A1 * | 3/2008 | Logan et al. | ...... | 725/34 |
| 2009/0017749 A1 * | 1/2009 | Braun | ...... | 455/3.01 |
| 2009/0144785 A1 * | 6/2009 | Walker et al. | ...... | 725/105 |
| 2009/0187826 A1 * | 7/2009 | Heimbold et al. | ...... | 715/719 |
| 2011/0093608 A1 * | 4/2011 | Sumler et al. | ...... | 709/231 |
| 2011/0214045 A1 * | 9/2011 | Sumler et al. | ...... | 715/202 |

OTHER PUBLICATIONS

Hayden, Tim; "Empowering Sports Fan with Technology", Computer Journal, IEEE Computer Society, Sep. 13, 2004, 2 pgs.*
Decker, Jeff C.; Riley, Patrick F.; "Analysis Architecture of a Mobile Sports Replay System", International Conference on Advanced Information Networking and Applications, Apr. 18-20, 2006, 6 pgs.*

* cited by examiner

*Primary Examiner* — Carl Colin
*Assistant Examiner* — Victor Lesniewski
(74) *Attorney, Agent, or Firm* — Luis M. Ortiz; Kermit D. Lopez; Ortiz & Lopez, PLLC

(57) ABSTRACT

A method for broadcasting a pre-recorded audio stream together with a video instant replay during a live event being broadcast, comprising, recording, prior to the live event, the comments of individuals who will be participating in the live event, transferring the recorded audio stream comments to an audio bank, accessing the audio stream during the live event, synchronizing the audio stream with a video instant replay of a portion of the live event, and broadcasting the synchronized prerecorded audio stream and video instant replay.

18 Claims, 1 Drawing Sheet

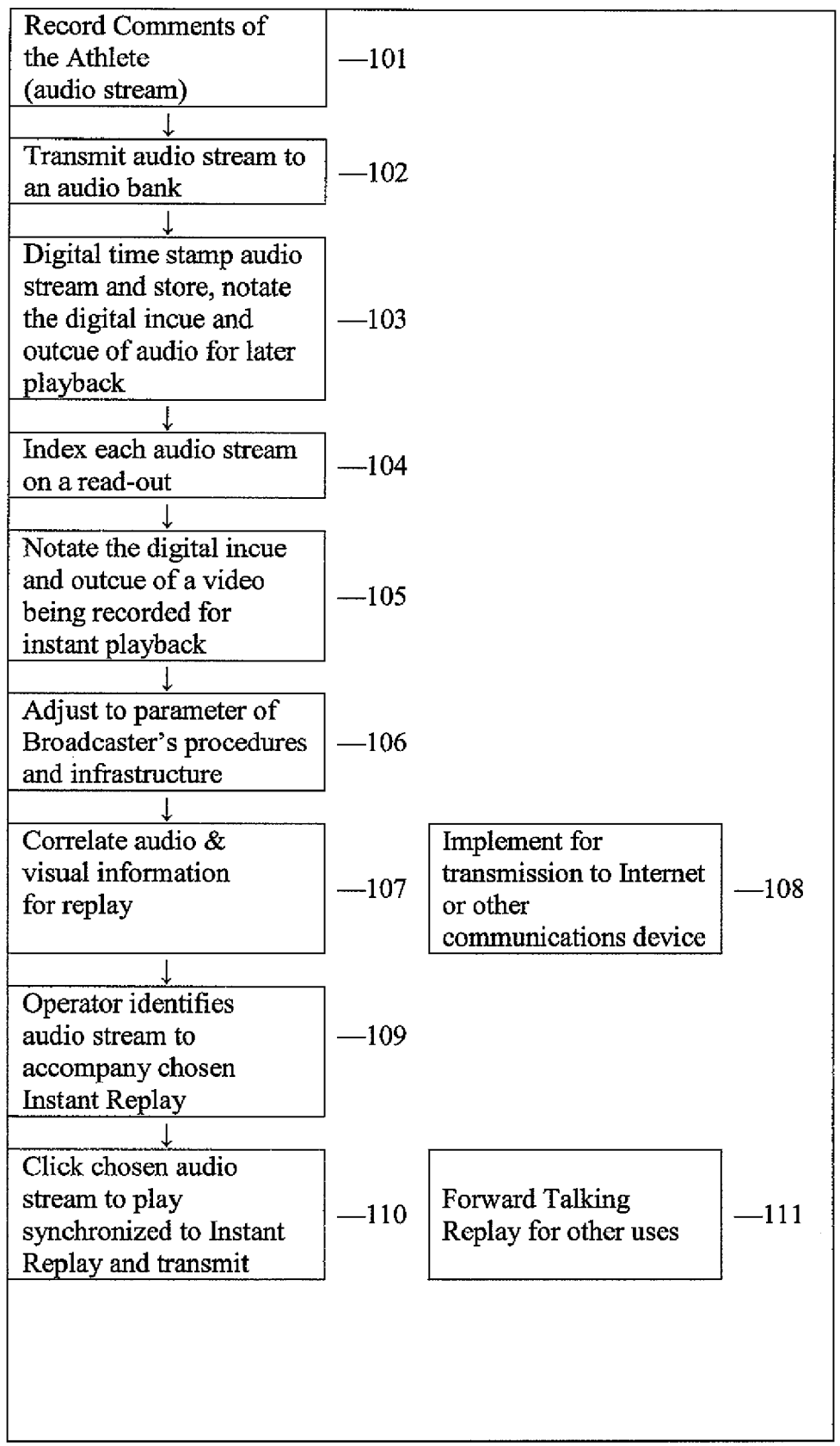

TALKING REPLAY

This application claims the benefit of U.S. Provisional Application No. 61/038,127, filed Mar. 20, 2008, which application is incorporated herein by reference in its entirety.

FIELD OF THE INVENTION

This invention relates to a method of determining and linking the pre-recorded audio comments of a participant in a live event to a corresponding Instant Replay of action occurring in the live event, in which the comments specifically relate to the action depicted in the Instant Replay, and transmitting this coupling of audio and video immediately within the broadcast of the live event as a uniquely identifiable commentary.

BACKGROUND OF THE INVENTION

The "Instant Replay" was introduced in 1963 by Applicant. Its purpose is to review action that has taken place in a live event, immediately after the action occurs. Since then, the Instant Replay has been in continual use as a form of video review, from the announcer's point of view, during a sporting event. Through the years, the Instant Replay has visually evolved but the nature of commenting over instant replays has fundamentally remained unchanged. The Instant Replay has also been used in the broadcast of entertainment events other than sports.

In sports competition, such as football, basketball, and most other sports, every player is involved in every play in some manner, so that it becomes interesting to isolate a player's thinking before the actual game takes place. Players have to be constantly thinking in order to execute the hundreds of variations of their offensive and defensive schemes. It would be of great interest to the fans to experience the game from the player's point of view. It would allow a player to convey his or her unique viewpoint, so that the fans can personally identify with him. The Talking Replay specifically taps into the player's insights, which heretofore have remained silent during a broadcast. Now a player will be able to make a pre-recorded comment over the related action which took place just seconds before.

BRIEF DESCRIPTION OF THE INVENTION

PROBLEM: Currently, no television procedure exists whereby the production team of a live broadcast can instantly interject a player's comments into their broadcast, whereby the audio rendering could immediately be linked to the related visual of an Instant Replay being aired, so that the athlete's personal comments could enlighten, or perhaps even correct, the game's storyline being presented by the announcing team's third-person approach.

SOLUTION: The use of a Talking Replay is the procedure that can immediately link the previously recorded audio comments of a player to a yet-to-be-recorded Instant Replay, in an instant manner.

The Talking Replay is a new and novel use of the Instant Replay, wherein the game announcer's audio is not repeated but a new audio track of the pre-recorded voiced comments of the athlete featured on the Instant Replay is linked to the Instant Replay. In football, as well as in other sports, the Instant Replay is a familiar feature. Applicant's unique invention described herein is to personalize the Instant Replay by having the athlete, isolated in the Instant Replay, verbally express his thinking in the play situation shown in the Instant Replay—hence: Talking Replay.

Athletes may record their comments at the event site, by telephone or by other voice transmission recording methods, at any point in time prior to the sports event, in a manner whereby the retrieved recorded audio can be precisely played back with a yet-to-be-determined video of an Instant Replay. An athlete's personal comments are prerecorded, encoded and indexed into an audio bank for retrieval. The audio's playback can be eventually mixed with the sound-effects only audio track (but not the announcers' audio track) being emitted by the Instant Replay chosen to be played back, due to its relevance to the live game in progress. The audio can then be broadcast, synchronized to an Instant Replay, in a manner whereby the dual playbacks have the desired starting points.

The Talking Replay provides a method of optimizing the recorded voice of the athlete, to hear what he or she may have been thinking as we take another look at what has just happened, thus providing a new form of communication to enter the broadcast.

The controlled synchronization needed for the concurrent replay is achieved by aligning the desired dual start points of the time-stamped audio and video files.

BRIEF DESCRIPTION OF THE DRAWINGS

FIG. 1 is a block diagram setting forth the step by step method of the invention.

DETAILED DESCRIPTION OF THE INVENTION

The present invention is more fully described with reference to FIG. 1 which is a block diagram of the steps to accomplish the invention. The first step is to pre-record the participant's (audio only) comments so that his or her pre-thinking can be transmitted later during the live event. These mental insights are recorded prior to the event and can be captured by phone, voice recorder, by a computer or any device with voice recording capability.

In step 101, verbal comments from an athlete, relating to an upcoming sports event in which he or she is going to participate, are recorded on any voice recording device and are eventually transferred to the proper server. One or more comments from one or more athletes participating in the event are recorded. This provides audio streams which are the talking portion of the invention.

The process then proceeds to step 102. The audio streams from step 101 are transmitted to an audio bank (database server) 102, wherein a digital time stamp marks the starting point (incue) and finishing point (outcue) of each audio stream to be eventually coupled to the video chosen to be suitable for replay. The audio stream comments are encoded and indexed for retrieval, at which time, they can be mixed with the sound-effects-only track that was recorded live with the Instant Replay chosen to be played back. This recorded sound-effects-only audio track is a separate track which contains the background sounds of the action only, and does not contain any announcer comments that had taken place at the time of the play. In addition, the audio stream comments can be segmented, if desired by the Talking Replay operator.

In step 103, the audio streams are time stamped and stored in a digital format within the audio bank. The digital incue and outcue points are notated for later playback.

In step 104, the audio streams are indexed on a read-out, derived from the transcribed audio, containing the best identifying words and/or phrases used by the athlete during his or her comments, so as to accompany a short video replay clip in which the comments are specifically related to the video replay clip.

While the video of the replay may be played at different speeds, the separately correlated background soundtrack remains at its constant speed. At times, a closer match-up between the athlete's thought and action can be achieved by the operator's use of an electronic zoom and/or by varying the speed of the video.

In step 105 the video available for an Instant Replay, is automatically time stamped when it is recorded, to select and notate its incue and outcue points.

The process then proceeds to step 106. The system procedure is adjusted to the various parameters of the broadcaster's communication infrastructure. Currently, most Instant Replays are executed on tapeless technology servers, such as the XT[2] production server, manufactured by EVS Broadcast Equipment of Belgium, or on other similar servers in use today. The loop recording facility of these servers allows operators to cut, edit, segment and replay, as soon as the system is in record mode. All cameras and live feeds are continuously recorded, ready for instant replay at any time. There are multiple servers and operators, so as to allow users to work simultaneously. Replay clips are easy to save, retrieve, and replay. Operators are able to save and replay instantly, up to 4000 audio/video clips. Today's loop recording technology ensures that no critical shot is ever missed. These servers can constantly ingest multiple video camera inputs simultaneously. There is no need to re-load clips and creating and playing a Talking Replay can be accomplished instantly. Each replay clip, available from an Instant Replay is automatically time stamped when it is recorded to serve as incue and outcue points.

The process then proceeds to step 107. The Talking Replay operator correlates audio and visual information for possible replay by anticipating upcoming action from an athlete who has recorded comments. For instance, if the lead-off hitter in a baseball game is coming up to bat, and he has pre-recorded comments, the Talking Replay operator anticipates that his comments may be utilized and identifies his audio streams while observing the action being video recorded.

Step 108 is optional in that the system can also be implemented in any software program, a web based service, a web browser, an operating system for computers and/or other communication, or wireless communication devices, so that the Talking Replay can be transmitted to the Internet or any other digital communications device.

The process then proceeds to step 109. Once an Instant Replay is chosen to be broadcast, a Talking Replay operator identifies an appropriate talking audio stream that will be synchronized, with its incue and outcue points, to the chosen Instant Replay when it is played back. The controlled synchronization needed for the concurrent audio-video replay is achieved by aligning the dual start (incue) points of the time-stamped audio and video files. The system, given instructions by the operator, automatically couples the audio (verbal) and visual information provided by each source for the intended synchronized replay.

The process then proceeds to step 110 where the synchronized audio stream and Instant Replay are transmitted for broadcast.

In optional step 111, the Talking Replays can eventually be forwarded to the League Office or the respective teams for additional usage on their digital and social networking services or added into a depository for later inclusion into websites, new features, programming and the like, for future retrieval.

Through the years, the Instant Replay has benefited from an array of technical breakthroughs, such as super slow motion, multiple isolations and the electronic first down line, and even the use of a third dimension. While all of these advancements have helped the Instant Replay to clarify itself visually, none of these advancements have provided the needed "sensory element" that the Talking Replay brings— that of adding the athlete's voice to his or her immediate playback.

With the use of the Talking Replay, the home audience no longer has to be solely dependent on the announcer's perception. In fact, a recent research study, funded by the Amateur Athletic Foundation of Los Angeles, reported that the phrases announcers use to describe an athlete's inner emotional state are purely speculative, since their third person observation has been taken solely from the athlete's appearance, for instance, "she's a nervous wreck", "quietly confident", "she's completely focused", "feeling proud", "he has fantastic concentration".

The Talking Replay deals with that present moment. As Scientific American Magazine points out in an article, "We are pattern-seeking, storytelling primates trying to make sense of what is currently happening around us . . . and wanting to know what others are feeling at the present moment." The Talking Replay does that.

By providing the athlete's narrative concentration, the Talking Replay, in effect, provides a logical connection, similar to the mental voice experienced when reading a novel. In literature, the use of inner monologues is common and often used to signify the real truth, since characters are given the opportunity to stand alone and portray their inner self, their thoughts and expectations.

Sports competitions are 80 percent mental, no matter the language. An athlete's voice is inevitably specific, it is gendered and accented even if it is played with an accompanying audio translation. For instance, the inner voice of a ski jumper could tell us the truth about that present moment, "While I'm waiting for the bell, I'm trying to avoid any fear that could make me late on my take-off. What I'll be doing is imagining gathering speed and pushing upward on the take-off. Then, when I'm in the air and leaning over my skis, I'll be visualizing my landing before it happens and imagining how I'll be flexing my knees and keeping my skis parallel to each other for a balanced touchdown despite yesterday's heavy snow."

The operational method of incorporating Talking Replays into a live event allows it to be implemented in live events of all kinds, such as concerts, theater, sportscasts of football and sportscasts other than football, such as, auto racing, baseball, basketball, billiards, bowling, cricket, golf, horse racing, ice hockey, ice skating, motorcross, rodeo, rugby, skate boarding, skiing, soccer, swimming and diving, track and field, volleyball and Canadian Football.

The Talking Replay is suitable for all sports, particularly a high impact sport, such as football, where the players are given a short amount of time to catch their breaths or make substitutions—with a lot of their concentration exercised during these pivotal moments. Each sport requires a unique focus and thus provides a different opportunity for the Talking Replay. While high impact sports such as hockey or football, demand a more intense focus, not all sports require a player to recover and play quickly again.

For instance, there are games, such as the game of baseball, which always has more time between plays and may even allow multiple Talking Replays on any given action. Other sports, such as distance running and swimming, require long-term concentration and focus and may require a constant form of re-imagination. This reserved approach can be implemented in other live sportscasts, namely: auto racing, basketball, billiards, bowling, cricket, golf, horseracing, ice hockey, ice-skating, motorcross, rodeo, rugby, skate boarding, skiing, soccer, swimming and diving, track and field and volleyball.

Viewers don't experience Instant Replays to be separate from the game. That is because the replays only divert their attention back to the game itself. This logical connectedness has a narrative concentration whereby the viewer does not have to rethink what is going on in the game. For instance, (fictionally) Yankee catcher, Jorge Posada, might provide an insight on how the Phillies', Shane Victorino, who was on first base, did nor did not steal second. If necessary, Posada's remarks can be spread out over two replays, as follows, "I know every time Shane gets on, he figures to get a good jump and taking a 10-foot lead. When he takes off, he doesn't waste any time with his first steps toward second. As soon as I see Shane's going, I'll be shifting my weight forward and pushing off my back leg so I don't have all of my weight sitting back there. If I did, I'd be throwing the ball too high. Even though Shane was limping yesterday, I know the he'll pretty much stay a straight-line slider, he doesn't hook slide much to beat the throw . . . so I'll be aiming straight and low, about a foot off to the right of the bag."

Talking Replay fuses the video of the Instant Replay and the audio of a timely personalized statement made specifically by a participating athlete, which can be played back, if so desired, as instantaneously as the non-talking replays currently being deployed. The Talking Replay allows the players to express themselves while in action during a live game. As an example, the following audio of a defensive cornerback is recorded before the game starts, "I want to block the wide receiver at the line, just as the play starts, if I can delay him for as little as a second, there's a good chance that the timing of his route will get screwed up and the quarterback won't be able to find him on the field". This audio is then chosen from an audio bank of many audios and played back with the Instant Replay when it correlates to the action that has just transpired within the game. At times, the airing of a Talking Replay could be of greater interest to the fans watching on TV, viewing a streaming feed, or listening on the radio, than from the usual rehash coming from the announcer booth. Often, the player's comments in the Talking Replay will add to, or at times even correct, comments made by the announcers.

For example, (fictionally) if the Talking Replay was recorded with Rafael Furcal (with his Dominican accent) of the L.A. Dodgers: two sound bites may have been cued up:
a) If he gets on base with a walk, Furcal would have previously recorded, "I know this guy's slider is hard to hit because it looks like a fastball before it breaks. As the leadoff hitter, I don't go to the plate looking for a walk but lots of times his pitches break so hard he can't control them and that'll put me on base with a walk."
b) When he's a base runner, Furcal would have recorded, "When I'm on base during a hit and run play, I only show the pitcher, and Soto the catcher, my normal lead. I don't want to give anything away. Timing matters more than the size of my lead."

The proof of concept of the Talking Replay was executed at the LA Coliseum during the live telecast of the City High School Football Championship Game, on Dec. 13, 2008, by local television station LA36. The recorded voice of San Pedro's linebacker, Robert Flanco was added to the Instant Replay immediately following his key tackle against the ball carrier from Narbonne High, the opposing team. Flanco's comments were recorded before the game. Once he approved what was written on an index card, it took Flanco just a couple of minutes to read and record, off camera, what he would be thinking during a tackle when the running play comes up the middle of the line.

LA 36 technical personnel requested and were instructed, by the Applicant, in the method of creating the Talking Replay. The television crew was anxious to try it in the broadcast of the City High School Football Championship Game. The results were successful and the LA 36 personnel were joyous, since they had executed a new element into their broadcast, something that they had not necessarily considered to be doable beforehand, something new and interesting for the viewers. They said that it all was done so swiftly, and with little trouble in cueing up the audio recording, that their play-by-play man and their director were both itching to do more. The next day, Tom Hoffarth of the Daily News wrote, "Talking Replay speaks for itself during L.A. City football title game." The result of this entirely new way of letting an athlete have a voice in the broadcast was not only hailed by the local press but also by others who were in agreement that the Talking Replay could dramatically improve a game broadcast, in an unforeseen way, since perhaps the best comment to be made during a game would otherwise have gone unsaid.

International Sports Examples (Fictional)

CRICKET: Australian batsman Adam Gilchrist is batting against Sri Lanka's bowler, Mahela Jayawardene.

Adam Gilchrist speaks:

"I find cricket to be very much a thinking man's game. When I'm batting against a bowler like Mahela I'm trying to imagine hitting his unusual slingshot delivery. That's what I'll be focused on, trying to pick up the ball's trajectory with him bowling them at speeds over 150 km/h (93 mph). I try to remember to keep my wrists loose and my bat straight with my grip high on the handle so I can whirl my bat like a hammer-thrower when Mahela's releases a low one—hoping to dispatch the ball skywards."

SOCCER EXAMPLE: Manchester United superstar winger Cristiano Ronaldo takes a free kick against Newcastle in a Premier League game.

Cristiano Ronaldo speaks:

"I know that the wall of Newcastle defenders, especially Nicky Butt, who will be jumping to prevent my shot dipping over them and beneath the crossbar. I won't be thinking about any of them. I'll be concentrating on how I am going to run toward the ball and how I am going to position my feet, and after that I'm thinking only about which side of the net I'm going to aim for. Then I look at the ball. Then I look at the net and I say to myself, 'Take the kick, Ronaldo,' then I shoot. Sometimes it ends well, sometimes not so well."

At times, if necessary, an interpreter can be used.

In addition, the Talking Replay provides a business opportunity for additional income to the network, the team, the league or other entity televising the game, by selling advertising for its use, such as, "This Talking Replay is brought to you by XYZ Company". Also, the Talking Replays can be made available on the Internet, on specific web sites, with associated advertising.

The Instant Replay has visually evolved through the years, but the nature of commenting over the Instant Replays has remained fundamentally unchanged. The prerecorded athlete's comments replayed over their actions shown on an Instant Replay will not only be expressed in different dialects and with different intonations but their inner reflections will be delivered as something special to their fans, hungry for something that won't be found on their sport's pages.

Having thus described the invention, I claim:

1. A method for broadcasting a pre-recorded audio stream segment together with a video instant replay during a live sports event being broadcast, comprising, electronically recording as an audio stream, prior to the live sports event, the verbal comments of an athlete about at least one anticipated play the athlete who will be participating in the live sports event will make during the live sports event, transferring the recorded audio stream comments to storage within a database and organizing and identifying the audio stream comments with indexing into at least one pre-recorded audio stream segment of an anticipated play by the athlete, and utilizing a media production system during the live sports event for:

selecting video of a play associated with the athlete during the live sports event as a video instant replay to be replayed in a broadcast, accessing the database during the live sports event and selecting from the database, via indexing data, the pre-recorded audio stream segment by the athlete of a play that matches the play within the video instant replay associated with the athlete, synchronizing the pre-recorded audio stream segment with the video instant replay, and broadcasting the synchronized pre-recorded audio stream segment and video instant replay.

2. The method of claim 1 comprising pre-recording a plurality of audio stream comments from more than one individual participating in and relating to the live sports event, transferring the audio stream comments to the database, organizing and indexing pre-recorded audio stream segments of anticipated actions or plays associated with each individual and listing the pre-recorded audio stream segments on a read-out in the audio bank, selecting one or more of the pre-recorded audio stream segments by its read-out, synchronizing the pre-recorded audio stream segments with a video instant replay associated with at least one individual and broadcasting the synchronized pre-recorded audio stream segments and video instant replay.

3. The method of claim 1 in which the broadcast is by television, Internet, or wireless communication device.

4. A method for broadcasting pre-recorded audio stream segments of pre-recorded comments from athletes about anticipated plays by the athletes together with a later-recorded video instant replay of related plays by the same athletes during a live sports event being broadcast, comprising, recording by electronic means, prior to the live sports event, a plurality of audio stream segments as comments by a plurality of athletes who will be participating in the live sports event, about anticipated plays by the athletes, wherein said plurality of audio stream segments are pre-recorded audio stream segments, transferring the pre-recorded audio stream segemnts to a server and digitally time-stamping and identifying each of the audio stream segments in association with an athlete, listing the audio stream segments on a read-out as an audio bank for accessing the audio stream segments during the live sports event, choosing a portion of video recording for the live sports event as action for the video instant replay, choosing an audio stream segment of the pre-recorded audio stream segments that is specifically related to an athlete and the action shown in the instant replay, synchronizing the audio stream segment that is specifically related to an athlete and the action shown in the instant replay with the video instant replay, and broadcasting the synchronized audio stream segment and video instant replay.

5. The method for broadcasting a pre-recorded audio stream segment together with a video instant replay of claim 4 in which the audio stream segments are indexed by the best identifying words or phrases of the audio stream segments.

6. The method for broadcasting a pre-recorded audio stream segment together with a video instant replay of claim 4 in which the video instant replay comprises an audio track of the sound-effects-only, which are mixed with the pre-recorded audio stream segment for broadcast.

7. The method for broadcasting a pre-recorded audio stream segment together with a video instant replay of claim 4 in which the video instant replay is played at varying speeds.

8. The method for broadcasting a pre-recorded audio stream segment together with a video instant replay of claim 4 in which the video instant replays are recorded on a tapeless production server having loop recording facility.

9. The method for broadcasting a pre-recorded audio stream segment together with a video instant replay of claim 4 in which an operator selects the audio stream segment from the server to be synchronized with a video instant replay.

10. The method for broadcasting a pre-recorded audio stream segment together with a video instant replay of claim 4 in which the synchronized talking replay is broadcast to one or more of television, Internet or wireless communication device.

11. A method for broadcasting a talking replay comprising a pre-recorded audio stream segment by an athlete about a particular play anticipated in an upcoming live sports event synchronized with a later recorded video instant replay, obtained during the live sports event being broadcast, comprising, providing a media production system in association with a live event including at least one server, a workstation, and communications network access, recording, prior to the live sports event, a plurality of audio stream comments about anticipated plays for the live sports event, by athletes who will be participating in the live sports event, transferring the recorded audio stream comments to an audio bank associated with the server, identifying audio stream segments associated with particular plays described verbally by the athletes from the plurality of audio stream comments, digitally time stamping the start point of each audio stream segment and indexing each audio stream segment with identifying information including athlete name and words and phrases that best identify an activity described by the athlete, listing the audio stream segments on a read-out in the audio bank for ease in accessing the audio stream segments during the live sports event, selecting video of an instant replay clip as a portion of the live sports event, time stamping the start point of the instant replay clip, selecting an audio stream segment from the read-out that is relevant to the selected instant replay clip based on identifying information, wherein the audio stream segment is selected from the plurality of audio stream segments, synchronizing the selected audio stream segment with the selected video of the instant replay clip to create a talking replay, and broadcasting the talking replay.

12. The method for broadcasting a talking replay of claim 11 in which the audio stream segment is made by an athlete featured on the video instant replay clip selected for use in creation of the talking replay.

13. The method for broadcasting a talking replay of claim 11 in which the video instant replay clips are recorded on a tapeless production server having loop recording facility.

14. The method for broadcasting a talking replay of claim 11 in which an operator selects the audio stream segment from the audio bank based on indexing to be synchronized with a video instant replay clip.

15. The method for broadcasting a talking replay of claim 11 in which the audio stream segment and video instant replay clip are synchronized by aligning the start points of the time stamped audio stream segment and video instant replay clip.

16. The method for broadcasting a talking replay of claim 11 in which the audio stream segment and video instant replay clip are further synchronized by aligning the incue and outcue points of the audio stream segment and video instant replay clip.

17. The method for broadcasting a talking replay of claim 11 in which the synchronized talking replay is broadcast to one or more of television, Internet or wireless communication device.

18. The method for broadcasting a talking replay of claim 11 in which advertising is sold sponsoring the Talking Replay.

* * * * *